Oct. 10, 1961 L. A. ARCHER 3,004,142
OVERHEAD AIR AND LIGHT DISTRIBUTOR UNIT
Filed Aug. 3, 1959 5 Sheets-Sheet 1

INVENTOR
Lee A. Archer

BY
ATTORNEYS

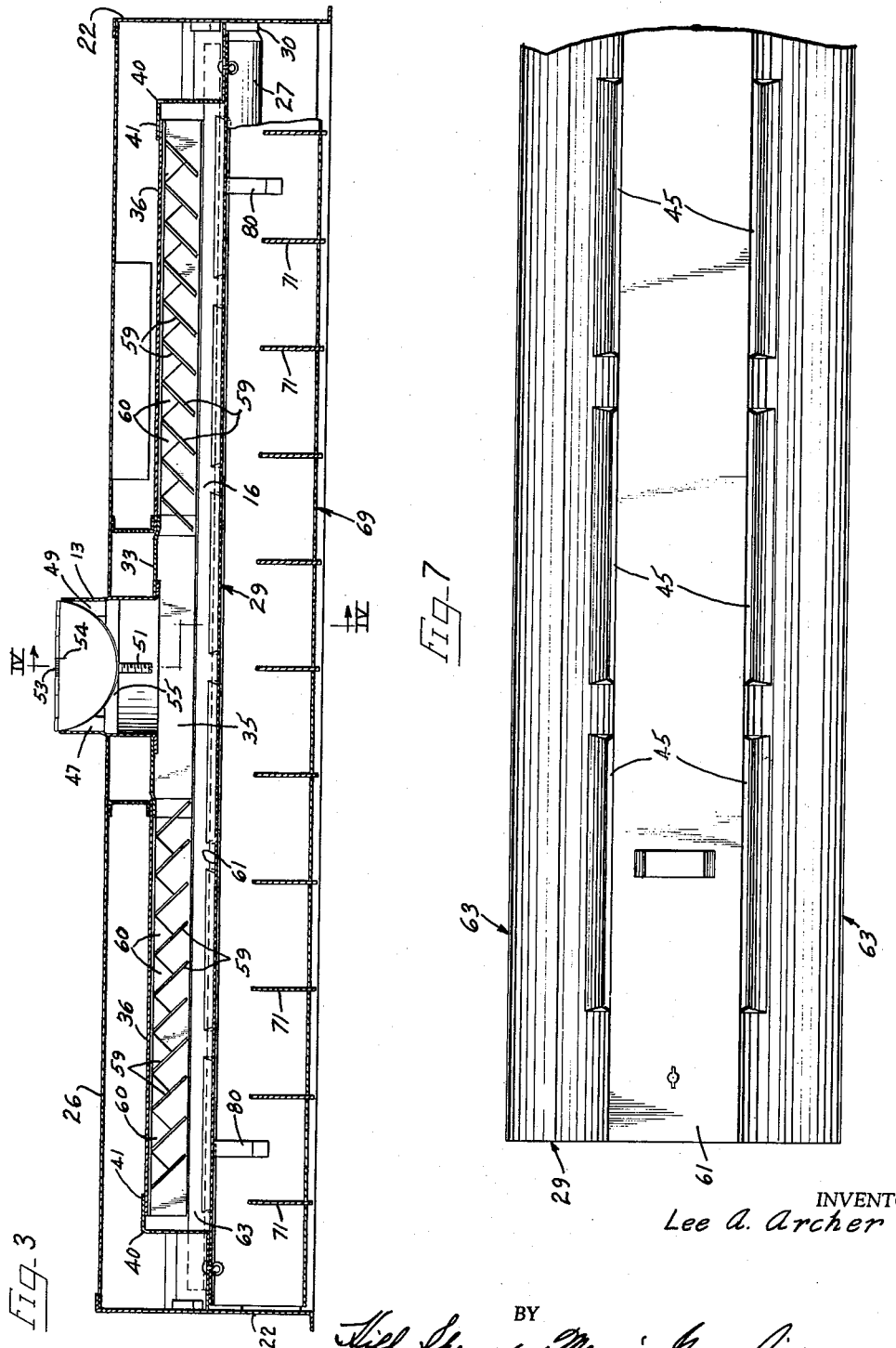

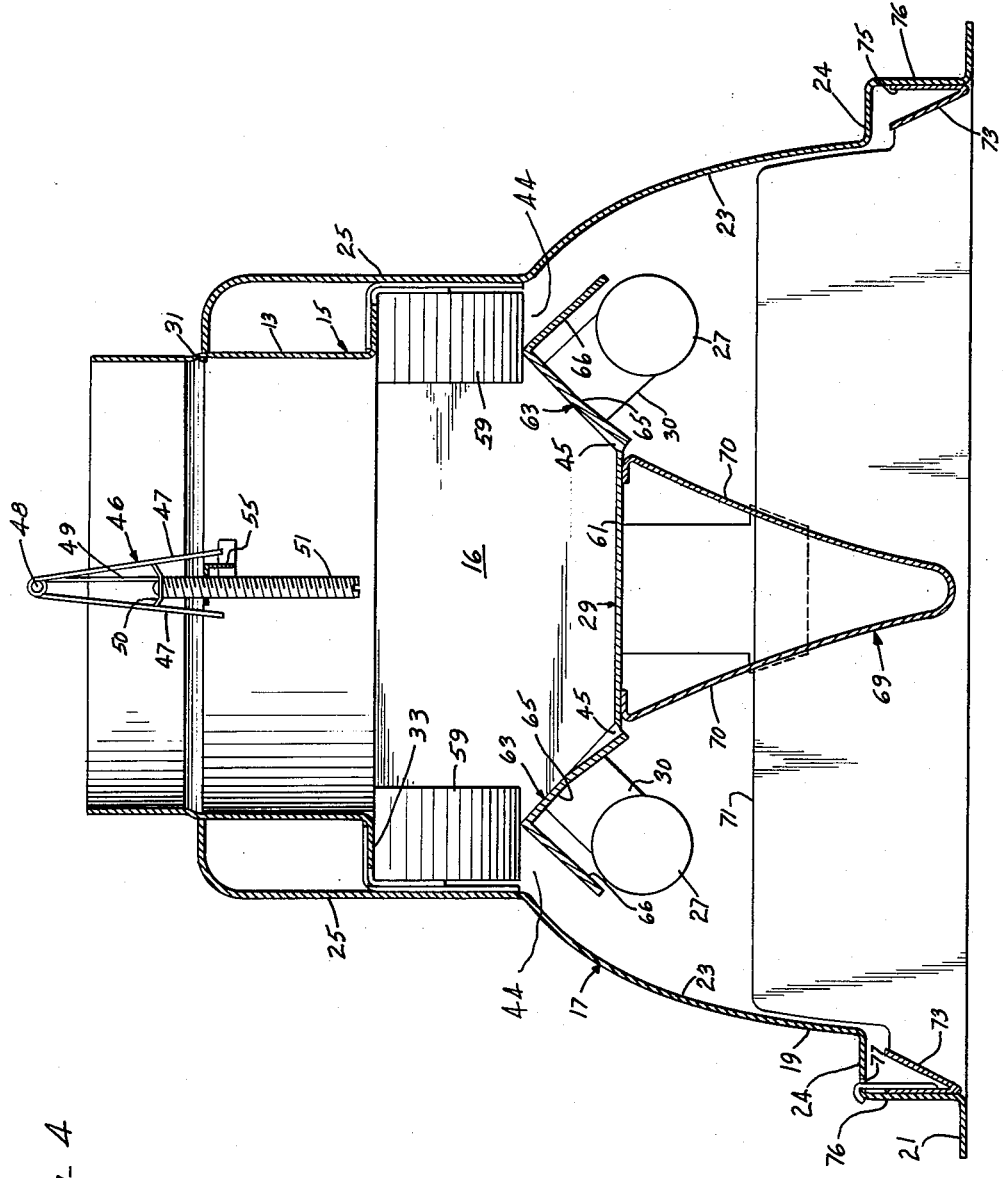

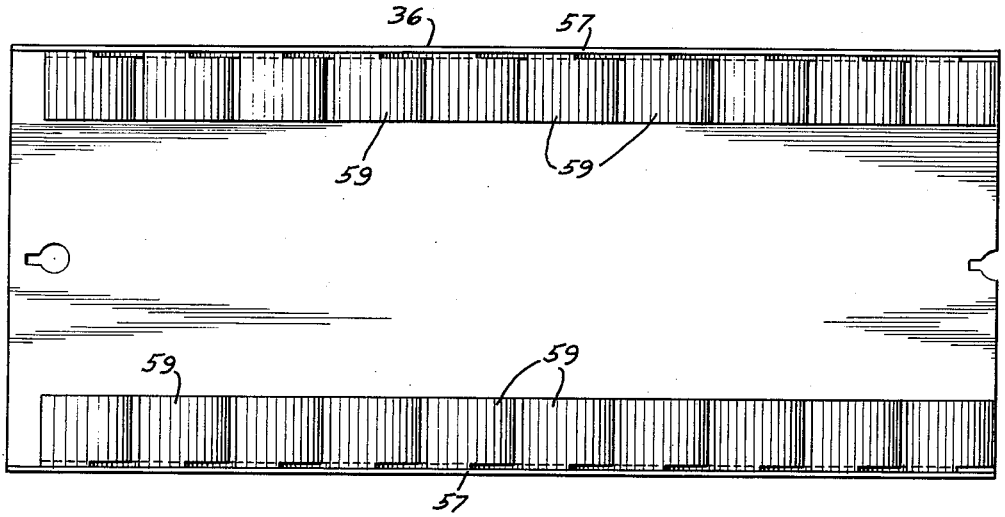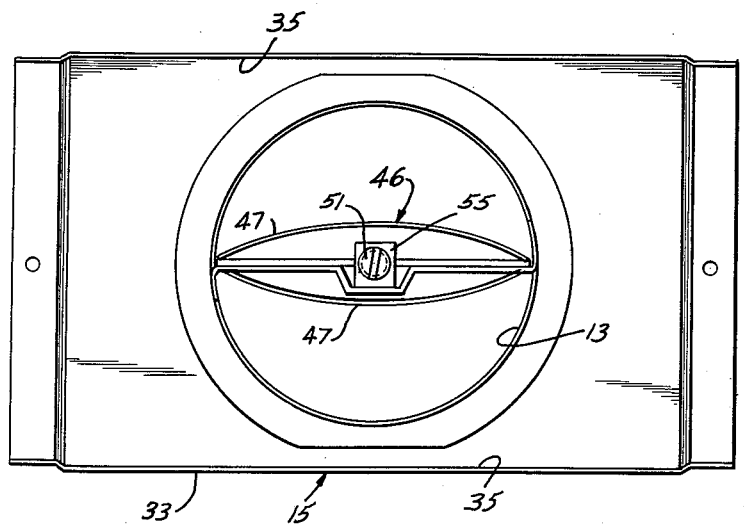

Oct. 10, 1961 L. A. ARCHER 3,004,142
OVERHEAD AIR AND LIGHT DISTRIBUTOR UNIT
Filed Aug. 3, 1959 5 Sheets-Sheet 5

INVENTOR
Lee A. Archer
BY
ATTORNEYS

United States Patent Office 3,004,142
Patented Oct. 10, 1961

3,004,142
OVERHEAD AIR AND LIGHT
DISTRIBUTOR UNIT
Lee A. Archer, Wheaton, Ill., assignor to The Pyle National Company, Chicago, Ill., a corporation of New Jersey
Filed Aug. 3, 1959, Ser. No. 831,245
8 Claims. (Cl. 240—9)

This invention relates generally to a combined air and light distributor unit, particularly characterized by the utilization of means forming a combined light-reflector and air distributing surface in registry with a light source and having communication with a source of ventilating air at increased pressure whereby a space will be ventilated concurrently with the reflection of light rays off the surface of the distributing unit into the same space.

It is an object of the present invention to provide a new and improved air and light distributor unit of the class described arranged with a view toward avoiding drafts and increasing the air circulating capacity of the unit.

Another object of the invention is to provide a novel lighting and ventilating apparatus of the type described, having an improved air circulation and shielding means for the light source, increasing the ventilating capacity of the unit and causing the light source to operate at an optimum temperature for maximum light emission and longer operating life.

Still another object of the invention is to provide a combined air and light distributing unit particularly adapted for lighting and conditioning the air in rooms, so arranged as to provide a uniform straight downward distribution of the air with no drafts and to avoid the cooling of the light source and the impairment of the efficiency thereof.

These and other objects of the invention will appear from time to time as the following specification proceeds and with reference to the accompanying drawings wherein:

FIGURE 3 is a longitudinal sectional view taken through the air and light distributor unit of the invention;

FIGURE 4 is a cross sectional view taken substantially along line IV–IV of FIGURE 3;

FIGURE 5 is a bottom plan view of one of the top covers for the plenum chamber showing the air deflecting vanes depending therefrom and extending along opposite sides thereof;

FIGURE 6 is a bottom plan view of the valve chamber;

FIGURE 7 is a fragmentary top plan view of the reflector; and

Figure 1:
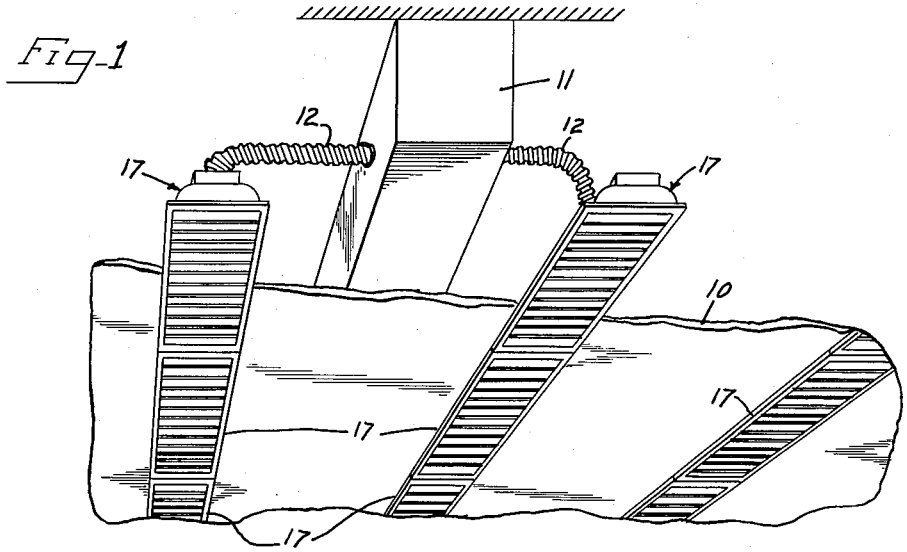
FIGURE 1 is a diagrammatic perspective view of the ceiling portion of a room having a ceiling with a false ceiling disposed therebeneath, with certain parts of the false ceiling broken away in order to illustrate one application of the light and air distributor unit of the invention.
Figure 2:
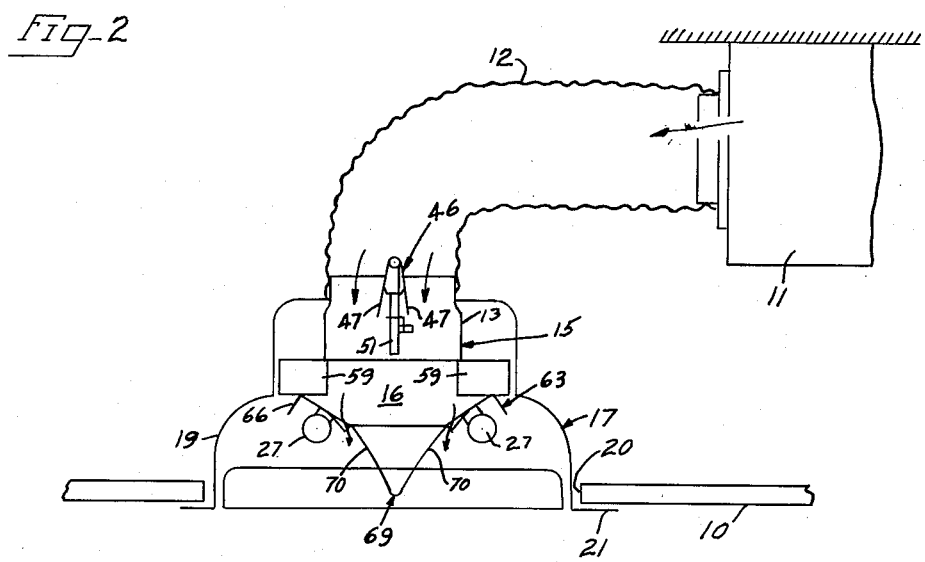
FIGURE 2 is a diagrammatic view of the air and light distributor unit diagrammatically showing the air and light distributor unit mounted in a false ceiling and having connection with a main ventilating duct extending along the ceiling of the room.

In the embodiment of the invention illustrated in the drawings, I have shown in FIGURES 1 and 2 an inner wall or false ceiling 10 spaced downwardly of the wall or ceiling of a space to be ventilated and have shown a main air duct 11 in the space between the ceiling and false ceiling. I have also shown flexible conduits 12 extending from opposite sides of the main air duct 11 and having connection with conduit portions or collars 13 or valve housings 15, leading into plenum chambers 16 of air and light distributor units 17. The air and light distributor units 17 are shown in FIGURE 1 as being located in end to end relation with respect to each other and as being parallel spaced to extend along the ceiling, the number and spacing of the units depending upon the requirements for light and air.

Each air and light distributor unit 17 includes an elongated troffer light housing 19, adapted to be recessed within an opening 20 in the ceiling 10, and having a flange 21 extending about the margin thereof and abutting the false ceiling, and accommodating the troffer light housing 19 to be substantially flush with the false ceiling.

The troffer light housing 19, as shown in FIGURES 3 and 4 includes end walls 22 and opposite side walls 23 extending for substantially the length of the troffer light housing. The side walls 23 converge inwardly from shouldered portions 24 of the troffer light housing and terminate into parallel spaced vertically extending wall portions 25, and turned inwardly at their upper end portions to cover the troffer light housing. The inner margins of the converging wall portions 23 may be coated with a light reflecting material, and form outer reflectors for parallel spaced fluorescent tubes 27 extending along the troffer light housing beneath a reflector 29. The fluorescent tubes 27 are mounted at their ends in mounting brackets 30, mounted on the end walls 22 at opposite ends of the troffer light housing. The mounting brackets 30 carry the usual sockets for the fluorescent tubes 27, and the usual electric circuitry is provided to effect energization of the fluorescent tubes 27 in a manner well known to those skilled in the art so not herein shown or described further.

The top cover 26 has a circular opening 31 formed therein to receive the conduits portion or collar 13 of the valve chamber 15. The valve chamber 15 in addition to the collar 13 includes an inverted generally rectangular pan 33 having parallel spaced side walls 35. The pan 33 in turn has inverted pans 36 extending from opposite ends thereof along the troffer light housing 19 above and along the reflector 29 and closed at their outer ends by spacers 40, shown in FIGURE 3 as being of a generally Z bar formation secured to the reflector 29 and having top angle portions 41 extending inwardly therefrom, parallel to the reflector 29 and having the ends of the pans 36 suitably secured thereto to support the ends of said pans above the reflector 29. The space between the top surfaces of the inverted pans 33 and 36 and the top surface of the reflector 29 forms the plenum chamber 16, for distributing the air along the troffer light housing 19 and downwardly through air passageways 44 between opposite sides of the reflector 29 and the inner surfaces of the wall portions 23, and through parallel spaced air slots 45 extending along and through the reflector 29 on the inner surfaces of the fluorescent tubes 27.

The conduit portion 13 of the valve housing 15 has a butterfly of damper valve 46 mounted therein and shown in FIGURES 3 and 4 as including two similar oppositely extending damper plates 47 mounted on a pivot pin 48 extending across the damper housing and suitably supported thereon in fixed relation with respect thereto, above the top surface of the cylindrical conduit portion of the valve housing on support members 49. The damper plates 47 are biased into engagement with a stop 50 on the upper end of an adjustment screw 51 by a torsion spring 53 on the hinge pin 48 and have opposite end portions 54 engaging the damper plates 47. The adjustment screw 51 is shown as being threaded within a horizontal leg of an angle support 55, extending across the conduit portion 13, and suitably supported within said conduit portion at its opposite ends. Turning of the adjustment screw 51 by a screw driver or the like, will thus raise or lower the stop 50 with respect to the fixed hinge pin 48, to open or close the damper valve in an obvious manner.

The inverted pans 36 have parallel spaced side walls 57, extending therealong and depending from the top thereof. The side walls 57 have a series of parallel spaced inclined deflector vanes 59 extending therealong, and herein shown as having ears or tabs 60 extending from the inner sides thereof and spot welded or otherwise secured to the sidewalls 57, and spacing the vanes 59 uniform distances apart in parallel relation with respect to each other.

As shown in FIGURE 3 the vanes 59 on each side of the valve housing are inclined in the direction of the flow of air towards opposite ends of the plenum chamber, and form in effect inefficient turbine blades, extending along the outlet passageways 44, into which the air flows and is expelled in staggered air streams through the outlet passageways 44, extending along opposite sides of the deflector 29. The vanes 59 thus reduce the endwise velocity components of the air entering the plenum chamber 16 and effect the discharge of air in a straight down direction along the outlet passageways 44, with no draft.

Referring now to the reflector 29, said reflector, as shown in FIGURE 4 has a central flat plate like portion 61 extending for the length of the troffer light housing, and has angled reflector portions 63 extending along and outwardly of opposite sides thereof and forming reflectors and shields for the fluorescent tubes 27, shielding said fluorescent tubes from the air passing along the passageways 44 and slots 45, and thereby preventing the air from cooling said fluorescent tubes and impairing the lighting efficiency thereof.

Figure 8:
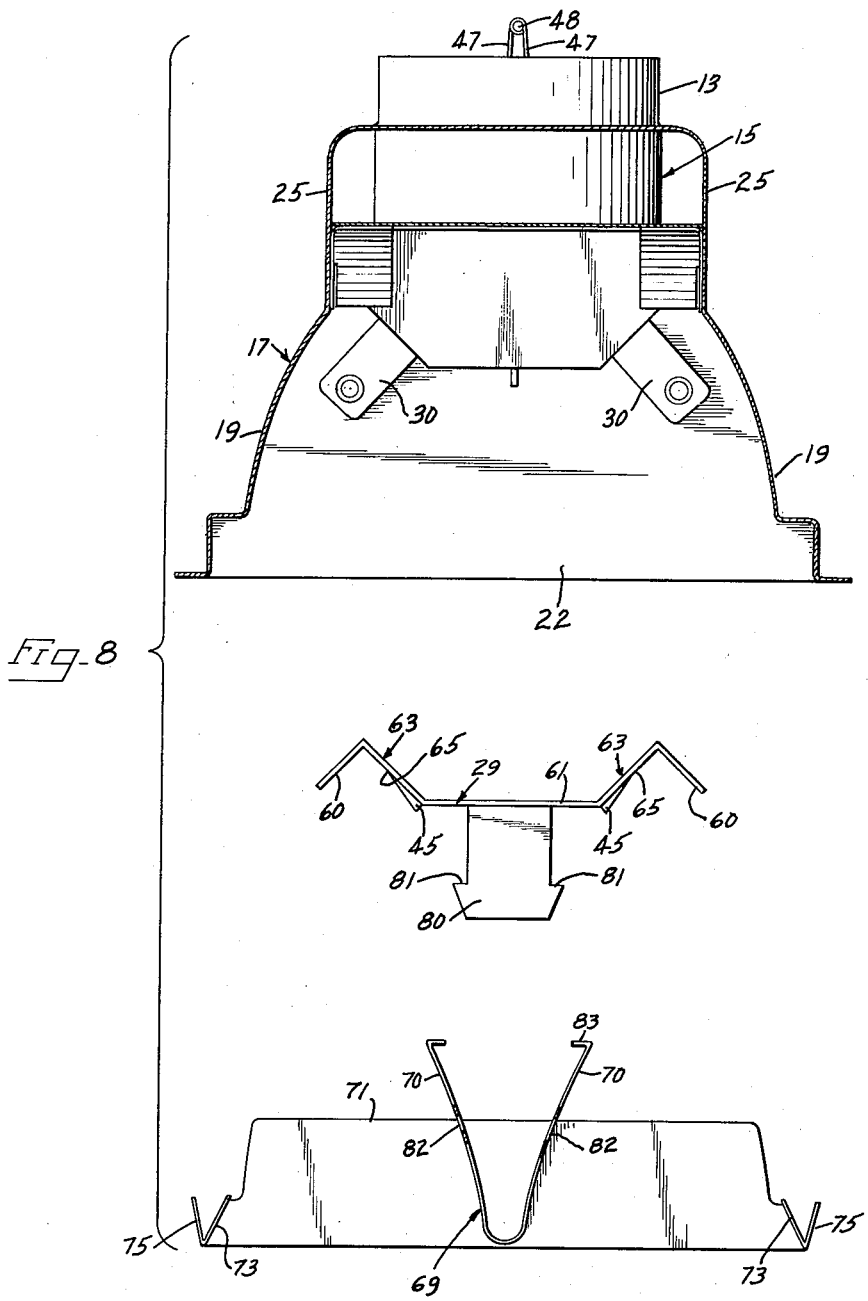
FIGURE 8 is an exploded view of the air and light distributor unit.

Each angled reflector 63, as shown in FIGURES 4 and 8, comprises an upper reflector portion 65 extending angularly upwardly from the side of the plate portions 61 of the reflector 29, and an inner reflector portion 66 extending downwardly from the upper reflector portion 65 at right angles with respect thereto.

It will be noted from FIGURE 4 that the inner reflector portion 66 extends beyond a radial line extending through the center of the associated fluorescent tube 27 and perpendicular to said reflector.

The upper reflector 25 is likewise parallel to a line drawn tangent to the fluorescent tube 27 at the point of intersection of a line extending through the center of said tube and perpendicular to said reflector and extends beyond the point of tangency of this line to the fluorescent tube. The reflectors 66 and 65 thus serve to protect the fluorescent tubes 27 from the air streams flowing downwardly through the slots 45 and through the outlet passageways 44 along the inner surfaces of the inner wall portions 23, and thereby prevent cooling of the fluorescent tubes 27, by the cool air passing through the passageways 44 and the air slots 45.

The air slots 45 extending along the outer margins of the plate like portion 61, are shown in FIGURES 4 and 7 as being pressed from the angled reflectors 63 along the points of juncture of said angled reflectors with the platelike portion 61, it being understood that the entire reflector 29 may be made from a single piece of sheet metal bent and punched or pressed as required.

Inwardly of the reflector 65 is a parabolic reflector 69 having inner generally parabolic reflecting surfaces 70, forming downward continuations of the reflectors 65. As shown in FIGURES 3, 4 and 8, the parabolic reflector 69 is slotted to accommodate a plurality of parallel spaced louvers 71, extending transversely of the troffer light housing, from one end thereof to the other, to extend upwardly therealong.

As shown in FIGURE 4, certain of the louvers 71 have angled retainers 73 welded or otherwise secured to opposite sides thereof adjacent the lower ends thereof. The retainers 73 have generally vertical outer end surfaces 75 abutting the insides of shouldered wall portions 76 of the troffer light housing 17. Certain of the members 73 have hooks secured to and extending upwardly from the vertical wall portions thereof, and passing through apertures 77 in the shoulder 24, to retain the louvered grill in position.

Spaced retainers 80 depend from the plate like portion 61 of the reflector 29 and have shouldered end portions 81, engaging slots 82 in the parabolic reflector 69 to retain inturned ends 83 of said reflector into engagement with the flat bottom of the reflector 29, and to thereby retain said parabolic reflector in position.

It may be seen from the foregoing that the air and light distributor unit of the invention is so arranged as to deflect the air upwardly as it enters the plenum chamber 43 through the inlet 13 and to create eddy currents therein and thereby partially convert the velocity head into a static head the remaining velocity head moving towards the ends of the plenum chamber. The baffles or vanes 69 extending from the valve housing along opposite sides of the plenum chamber above the air outlet openings 44, thus form in effect inefficient turbine blades, with the result that the outgoing air leaving the spaces between the vanes impinges against the outgoing air deflected by the vanes, resulting in a turbulent air stream emerging through the discharge passageways 44 in a straight down direction without endwise velocity components.

It may also be seen that the reflectors for the fluorescent tubes 27 are so arranged as to form deflectors for the air accommodating the air to pass along opposite sides of the fluorescent tubes, in a substantially straight downward direction, and shielding the tubes against the cooling effects of the air as it passes downwardly along opposite sides of the fluorescent tubes, in spaced relation with respect thereto.

While I have herein shown and described one form in which my invention may be embodied, it may be understood that various modifications and variations in the invention may be attained without departing from the spirit and scope of the novel concepts of the invention as defined by the claims appended hereto.

I claim as my invention:

1. In an overhead air and light distributor unit, an elongated troffer light housing having upwardly and inwardly extending inner side walls, a reflector extending along said troffer light housing above the bottom thereof and having a parabolic reflector extending downwardly therefrom along the center thereof and defining lighting troughs beneath said reflectors and a plenum chamber thereabove, an air inlet into said plenum chamber intermediate the ends thereof admitting the air directly onto the upper surface of said reflector to create eddy currents therein and thereby convert the velocity head of air into a static head of air, said reflector having angular reflector portions extending for the length thereof, including upwardly inclined reflector portions extending along opposite sides of said parabolic reflector and downwardly inclined reflector portions inclined downwardly from the upper end portions of said upwardly inclined reflector portions and having terminal edge portions spaced inwardly from said inner side walls and cooperating therewith to form air passageways along said inner side walls, fluorescent tubes extending along said angular reflector portions and shielded thereby, a series of aligned slots extending through said upwardly inclined reflector portions, at the inner margins thereof and directing the flow of air along said parabolic reflector.

2. In an overhead air and light distributor unit, an elongated troffer light housing having upwardly and inwardly extending inner side walls, a reflector extending along said troffer light housing above the bottom thereof and having a parabolic reflector extending downwardly therefrom along the center thereof and defining lighting troughs beneath said reflectors and a plenum chamber thereabove, an air inlet into said plenum chamber intermediate the ends thereof admitting the air directly onto the upper surface of said reflector to create eddy currents therein and thereby convert the velocity head of air into a static head of air, said reflector having angular reflector portions extending for the length thereof, including upwardly inclined reflector portions inclined upwardly from opposite sides of said parabolic reflector and downwardly inclined reflector portions inclined downwardly from said upwardly inclined reflector portions, fluorescent tubes extending along said angular reflector portions and shielded thereby, a series of aligned slots extending through said upwardly inclined reflector portions, at the inner margins thereof along said parabolic reflector, and directing the flow of air along said parabolic reflector, the downwardly inclined reflector portions being spaced from and extending in the general planes of said inner side walls and directing the flow of air downwardly along said inner side walls, and deflector vanes extending along opposite sides of said plenum chamber and inclined in opposite directions from the transverse center of said plenum chamber angularly upwardly towards opposite ends of said plenum chamber, said deflector vanes being spaced from said air inlet and being inclined in the direction of the flow of air toward the ends of said plenum chamber and reducing the endwise velocity components of the air and directing the air straight downwardly along the upper faces of said angular reflectors in the spaces between said reflector portions and said inner side walls, and through said slots and along said parabolic reflector.

3. In an overhead air and light distributor unit, an elongated troffer light housing having upwardly and inwardly extending inner side walls, a reflector extending along said troffer light housing above the bottom thereof and having a parabolic reflector extending downwardly therefrom along the center thereof and defining lighting troughs beneath said reflectors and a plenum chamber thereabove, an air inlet into said plenum chamber intermediate the ends thereof admitting the air directly onto the upper surface of said reflector to create eddy currents therein and thereby convert the velocity head of air into a static head of air, said reflector having angular reflector portions extending for the length thereof, including upwardly inclined reflector portions extending along opposite sides of said parabolic reflector and downwardly inclined reflector portions inclined downwardly from the upper end portions of said upwardly inclined reflector portions and spaced from said inner side walls and extending generally parallel thereto to form air passageways between said inner side walls and said downwardly inclined reflector portions, fluorescent tubes extending along said angular reflector portions and shielded thereby, a series of aligned slots extending through said upwardly inclined reflector portions, at the inner margins thereof along said parabolic reflector, directing the flow of air along said parabolic reflector, the downwardly inclined reflector portions directing the flow of air along said inner side walls, and deflector vanes extending along opposite sides of said plenum chamber and inclined in opposite directions from the transverse center of said plenum chamber angularly upwardly from the bottom of said plenum chamber towards opposite ends of said plenum chamber, said deflector vanes being spaced from said air inlet and being inclined in the direction of the flow of air toward the ends of said plenum chamber and reducing the endwise velocity components of the air and directing the air straight downwardly along the upper faces of said angular reflectors in the spaces between said reflector portions and said inner side walls, and through said slots and along said parabolic reflector, and damper valve means in said air inlet adjustable to vary the flow of air thereinto.

4. In an overhead air and light distributor unit, an elongated troffer light housing having upwardly and inwardly extending inner side walls, a reflector extending along said troffer light housing above the bottom thereof and having a parabolic reflector extending downwardly therefrom along the center thereof and defining lighting troughs beneath said reflectors and a plenum chamber thereabove, an air inlet into said plenum chamber intermediate the ends thereof admitting the air directly onto the upper surface of said reflector to create eddy currents therein and thereby convert the velocity head of air into a static head of air, said reflector having angular reflector portions extending along opposite sides thereof, including upwardly inclined reflector portions extending upwardly from opposite sides of said parabolic reflector and downwardly inclined reflector portions inclined downwardly from the upper end portions of said upwardly inclined reflector portions in generally parallel relation with respect to said inner side walls and forming air passageways between said downwardly inclined reflector portions and said inner side walls, fluorescent tubes extending along said angular reflector portions and shielded thereby, a series of aligned slots extending through said upwardly inclined reflector portions, at the inner margins thereof along said parabolic reflector, directing the flow of air along said parabolic reflector, the downwardly inclined reflector portions directing the flow of air along said inner side walls away from said fluorescent tubes, and deflector vanes extending along opposite sides of said plenum chamber and being inclined in opposite directions from the transverse center of said plenum chamber angularly upwardly from the bottom of said plenum chamber towards opposite ends thereof, said deflector vanes being spaced from said air inlet and being inclined in the direction of the flow of air toward the ends of said plenum chamber and reducing the endwise velocity components of the air and directing the air straight downwardly along the upper faces of said angular reflectors in the spaces between said reflector portions and said inner side walls, and through said slots and along said parabolic reflector, a series of louvers extending transversely of said troffer light housing beneath said fluorescent tubes and through said parabolic reflector and thereby retaining said parabolic reflector in position in engagement with said first mentioned reflector.

5. In combination with a ceiling, a space to be illuminated and ventilated, a false ceiling spaced below said ceiling, a supply duct extending into the space above said false ceiling, an air and light distributing unit in said false ceiling and comprising a troffer light housing having walls forming a lighting trough above the level of said false ceiling, fluorescent tubes in said lighting trough, a reflector extending along said lighting trough between and over said fluorescent tubes and defining a lighting chamber beneath said reflector and a plenum chamber above said reflector, an air inlet leading into said plenum chamber intermediate the ends thereof, said reflector having an upwardly facing generally flat plate-like surface forming the bottom of said plenum chamber and baffling the air discharged thereonto through said inlet, creating eddy currents therein and thereby converting the velocity head into a static head of air, said reflector also having angular reflector portions extending angularly upwardly from opposite sides of said flat plate-like surface, and having depending reflector portions depending from said angular reflector portions and extending beyond the centers of said fluorescent tubes in spaced relation with respect to said walls, and with said walls forming air passageways directing the air downwardly along said walls, said reflector also having a parabolic reflector depending from said flat plate-like surface along the inner sides of said fluorescent tubes, and spaced air slots extending along said reflector positioned and directing the flow of air downwardly along said parabolic reflector away from said fluorescent tubes.

6. In the combination of claim 5, deflector vanes extending along said plenum chamber upwardly of said angular reflector and inwardly therefrom whereby said angular reflectors will direct the streams of air along said walls and through said slots, and said deflector vanes being inclined toward each end of said plenum chamber and terminating at opposite sides of said air inlet, and being so constructed and arranged as to reduce the endwise velocity components of the air and to direct the air straight downwardly along opposite sides of said angular reflectors along said walls and through said slots.

7. In the combination of claim 6, louvers extending transversely of said lighting trough through said parabolic reflector, and means for supporting said louvers in said lighting trough and retaining said parabolic reflector in reflective position with respect to said fluorescent tubes.

8. An air and light distributor unit adapted for mounting in a false ceiling comprising a troffer light housing having upwardly extending inner wall portions forming a light trough above the level of the false ceiling, a reflector extending along said light trough and comprising a central flat plate having parallel spaced angular reflector portions extending angularly upwardly from opposite sides thereof and having outer reflector portions depending from said angular reflector portions and spaced from said inner wall portions and inclined to direct the air in the spaces between said reflector portions and said inner wall portions, elongated fluorescent tubes mounted in said housing beneath said angular reflector portions, a plenum chamber above said reflector and extending along said housing for substantially the length thereof, an air duct leading into said plenum chamber from the top thereof, vertically disposed deflector vanes extending upwardly from said angular reflectors across the spaces between said depending reflector portions and said inner side walls, said vanes on opposite sides of the transverse center of said plenum chamber being inclined in the direction of flow of air toward the ends of said plenum chamber and directing the air to flow in a straight downwardly direction, a series of air passageways at the junctures of said angular reflector portions and said central flat plate, and said upwardly extending and depending angular reflector portions dividing the air stream to pass downwardly along opposite sides of said fluorescent tubes and thereby protecting said fluorescent tubes from the cooling effects of the ventilating air.

References Cited in the file of this patent

UNITED STATES PATENTS

| | | |
|---|---|---|
| 2,683,799 | Taylor et al. | July 13, 1954 |
| 2,845,854 | Kurek | Aug. 5, 1958 |
| 2,845,855 | Burns | Aug. 5, 1958 |